July 10, 1934.　　　H. O. MERCIER　　　1,965,779
DOUGH WORKING MACHINE
Filed June 15, 1932　　10 Sheets-Sheet 1

Fig. 1

HARVEY O. MERCIER
INVENTOR
BY Henry J. Savage
ATTORNEY

Fig. 4

July 10, 1934. H. O. MERCIER 1,965,779
DOUGH WORKING MACHINE
Filed June 15, 1932   10 Sheets-Sheet 5

HARVEY O. MERCIER
INVENTOR
BY Henry J Savage
ATTORNEY

July 10, 1934.  H. O. MERCIER  1,965,779
DOUGH WORKING MACHINE
Filed June 15, 1932   10 Sheets-Sheet 6

Fig. 6

HARVEY O. MERCIER
*INVENTOR*
BY Henry Savage
*ATTORNEY*

Fig. 7

July 10, 1934.          H. O. MERCIER          1,965,779
DOUGH WORKING MACHINE
Filed June 15, 1932          10 Sheets-Sheet 9

Fig.11

HARVEY O. MERCIER
INVENTOR
BY Henry J Savage
ATTORNEY

Patented July 10, 1934

1,965,779

UNITED STATES PATENT OFFICE 1,965,779

DOUGH WORKING MACHINE

Harvey O. Mercier, East Orange, N. J., assignor to National Biscuit Company, New York, N. Y., a corporation of New Jersey Application June 15, 1932, Serial No. 617,338

40 Claims. (Cl. 107—12)

My invention pertains to improvements in dough working machines, and particularly to machines for rolling or sheeting sponge doughs.

Doughs may be classed generally as sweet dough and sponge dough, the former including doughs for making cookies, snaps and other sweet goods that may or may not undergo a period of fermentation with yeast or other leaven, while sponge doughs include those fermented, unsweetened doughs that are used for baking crackers, biscuit and the like.

Sponge doughs, owing to their relatively long period of fermentation and the strength or quality of the flours used during their fermentation, acquire a characteristic cellular, more or less stringy, structure, which, when the dough is rolled or sheeted in one direction, produces a sheet having a laminated fibrous structure that survives in the baked product. This effect is accentuated by the addition of flours of different qualities and strength to the sponge in the mixers, and by the return of scrap from a previous batch to a new batch of dough about to be rolled. This laminate or semi-fibrous structure resulting from rolling the dough in a single direction is objectionable because the crackers or other biscuit baked from it will have a similar structure and be weak or inclined to split in the direction in which the dough was rolled. Also some kinds of flour, the returned scrap, and gases in the dough have a tendency to segregate and elongate when the dough is rolled in a single direction, which results in an inferior product of non-uniform texture.

It has been found that the above structural objections are overcome and the quality of the crackers or biscuit greatly improved by rolling the dough first in one direction, then folding or lapping the sheet on itself, and rerolling the folded sheet at right angles to the first rolling. This second rolling is called cross-rolling of the dough and one of its results or advantages is to spread and merge the elongated particles and gases that have been stretched out by the first rolling and produce crackers of improved quality and tenderness.

It has also been found that the quality of the dough and the biscuits is affected very greatly by both the speed of rolling and the pressure exerted by the rollers. Thus crackers that are baked from dough that has been rolled at high speed and under relatively light pressures, are of superior quality to crackers produced from dough that has been rolled slowly, exposed to the air for a longer time, or subjected to high pressure.

Rapid rolling necessarily shortens the time that the dough sheet is exposed to the drying and hardening influence of the atmosphere, minimizes the escape of gases produced from the leaven, and light pressure in rolling retains the gases and leaves the dough sheet in a soft springy state. Too great pressure is exerted by the rolls when the dough is reduced from a shapeless mass to a thin sheet by a single or too few rollings. A superior product results when the dough is rolled two or more times to gradually reduce its thickness to the final degree for the cutters.

Cross-roll dough brakes as heretofore used have operated usually with two sets of rollers, the first set receiving dough constantly which is rolled into a continuous sheet, folded upon itself in zig-zag or diagonally overlapped relation, the overlapping folds being fed continuously to a second set of rollers which rolls the dough at a considerable angle, about 75°, to its first rolling, and then delivers it to the finishing rolls of the cutting machine. Machines of this kind have many advantages, but all have these disadvantages, namely; that the second rolling is not wholly at right angles or across the first rolling, the zig-zag overlapping of the dough causes a varying thickness of the sheet between the edges and center with consequent irregular conditioning, and the time of rolling is so slow, owing to the limited capacity or speed of the cutting machine, which determines the speed of the second rolling, that the gases are largely squeezed out of the dough and the sheet is exposed to the air so long as to acquire a superficial film or skin that retards baking and checks rising or puffing of the dough in the oven.

Another method now largely used, is to first roll the dough in one direction, and as the sheet of dough comes from the rollers, to fold it by hand in several super-imposed layers, and, then when a sufficient batch has been rolled and folded, to carry it back to the rollers and reroll it at right angles, or cross-roll it. My present invention saves all of the labor of folding and carrying the batches of dough and also is much more sanitary in that it minimizes handling.

With the above conditions and objects in mind, and also having in mind the objections to existing machines, I have invented an improved cross-roll dough brake in which batches of dough of predetermined size are fed intermitting to a set of high speed rollers which sheet the dough and deliver it to a reciprocating apron whereon the sheet is lapped in a definite number of folds and then delivered by the apron to a second set of rollers which rerolls the dough at right angles to its first rolling. The sheet of dough leaving the second set of rollers is dusted with flour which prevents the folds from sticking together and facilitates machining, the sheet being delivered to an oscillating apron whereon it is again received in folds. The flour is dusted on the dough as it is being rolled the second time by means that is automatically controlled by the batch of dough being rolled. The automatic control of the flour effects an economy as well as producing improved mechanical qualities in the dough. When the entire batch of dough is folded on this apron it is delivered to a delivery platform or conveyor and thence to the cutting machine for final rolling and cutting. At the cutting machine, the dough sheet is unfolded manually as it enters the rollers on the cutting machine where it is rolled to its final thickness before cutting. My machine is driven at very high speed which enables a single unit to cross-roll enough batches of dough to supply a number of cutting machines. This greatly reduces both the time of rolling and the time that the dough sheet is exposed to the air and results in a sheet of dough being delivered to the cutters and to the oven that is soft and springy and responds readily to the action of the oven heat. Because of this rapid rolling and handling of the batches of dough, the pressure on the sheet is not exerted for a long enough period to destroy the natural resiliency of the dough and the gases are not squeezed out or lost by exposure to the air and the biscuit or crackers are much lighter and tenderer.

In my machine only batches of dough of definite predetermined mass will be rolled, each batch, usually weighing from fifty (50) to sixty (60) pounds as the case may be, being just sufficient to produce a fixed number of laps in the sheet of dough on the first reciprocating apron. The cycle and speed of the machine is adjusted to produce this number of folds in the dough, depending on the characteristics of the dough and the thickness of the sheet rolled by the first set of rollers. With these conditions predetermined for a given batch of dough (say 55 lbs.), the sheet of dough will have a fixed number of folds or laps, (say 6) and the stack delivered to the second set of rollers will always be of a certain height or thickness which will cause the second set of rollers always to exert a definite squeeze or pressure on the dough passing between them. Thus I am able to definitely predetermine and control all operating conditions.

In addition to the foregoing and other objects and advantages of my invention is the provision of means for measuring or determining the size or quantity of the batches of dough that are supplied to the first set of rollers. My invention also contemplates means for automatically dusting flour on the dough as it is being rolled.

Reference will now be had to the accompanying drawings wherein I have illustrated one practicable embodiment of my invention.

Figure 11:
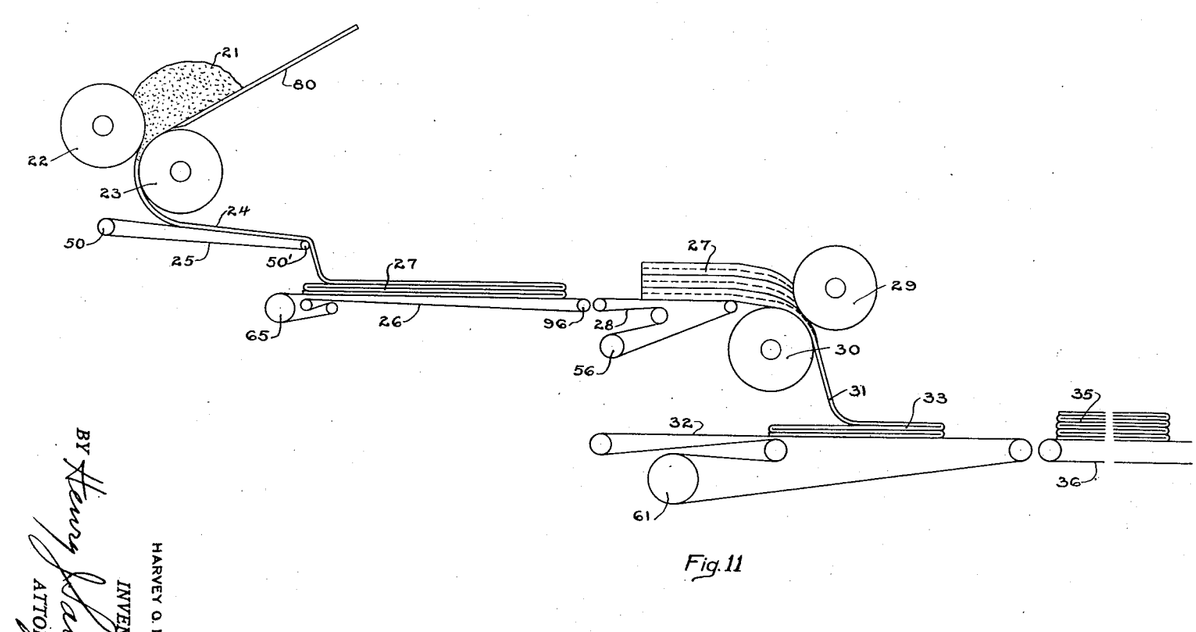
Fig. 11 is a diagram showing the sequence of operations of the machine, the first set of rollers and aprons being turned through 90° horizontally from their actual position in the machine.
Figure 12:
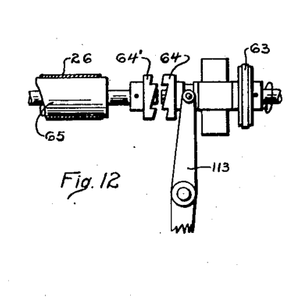
Fig. 12 shows how the clutch elements 64, 64' are separated during the time that the first dough receiving apron is being reciprocated, the clutch element 64' travelling with the apron.

Referring first to Fig. 11, which is a diagrammatic representation of the operation of the machine, 80 indicates a feed board which feeds a mass of dough 21 of predetermined weight between the rollers 22, 23, which roll it into a sheet 24 that falls upon a continuously running guide apron 25, which delivers the sheet of dough to a reciprocating apron 26 on which it is deposited in folds 27. After the batch of dough has been deposited in folds on the apron 26, it is delivered to the continuously driven apron 28, which in turn feeds the batch of dough to the second set of rollers 29, 30. These rollers again form the dough into a sheet 31, which is delivered to the upper run 32 of a reciprocating apron on which the sheet of dough is again deposited in folds 33. When the entire batch of dough has been rolled the second time and deposited in folds 33 on the conveyor 32, the reciprocating movement stops and the conveyor 32 is then driven in one direction so as to deliver the batch 35 to a delivery apron or platform 36, from which it is carried or otherwise conveyed to the cutting machine for the final rolling and cutting operations. In this Fig. 11, the rollers 22, 23, and the apron 25 are shown as operating parallel to the second set of aprons and rollers, but it will be understood that this figure is only diagrammatic and in the actual machine, this first set of rollers and apron are at right angles to the position here shown. It will be noted that the batch of dough 27, being fed to the rollers 29, 30, has been turned at right angles to its position on the conveyor 26. The dough, when being rolled by the second set of rollers, is rolled at right angles to the direction in which it was rolled by the first set of rollers 22, 23, and flour is sifted on it from the automatic flour sifter so that the folds of dough delivered to the conveyor 36 will not stick together.

Figure 7:
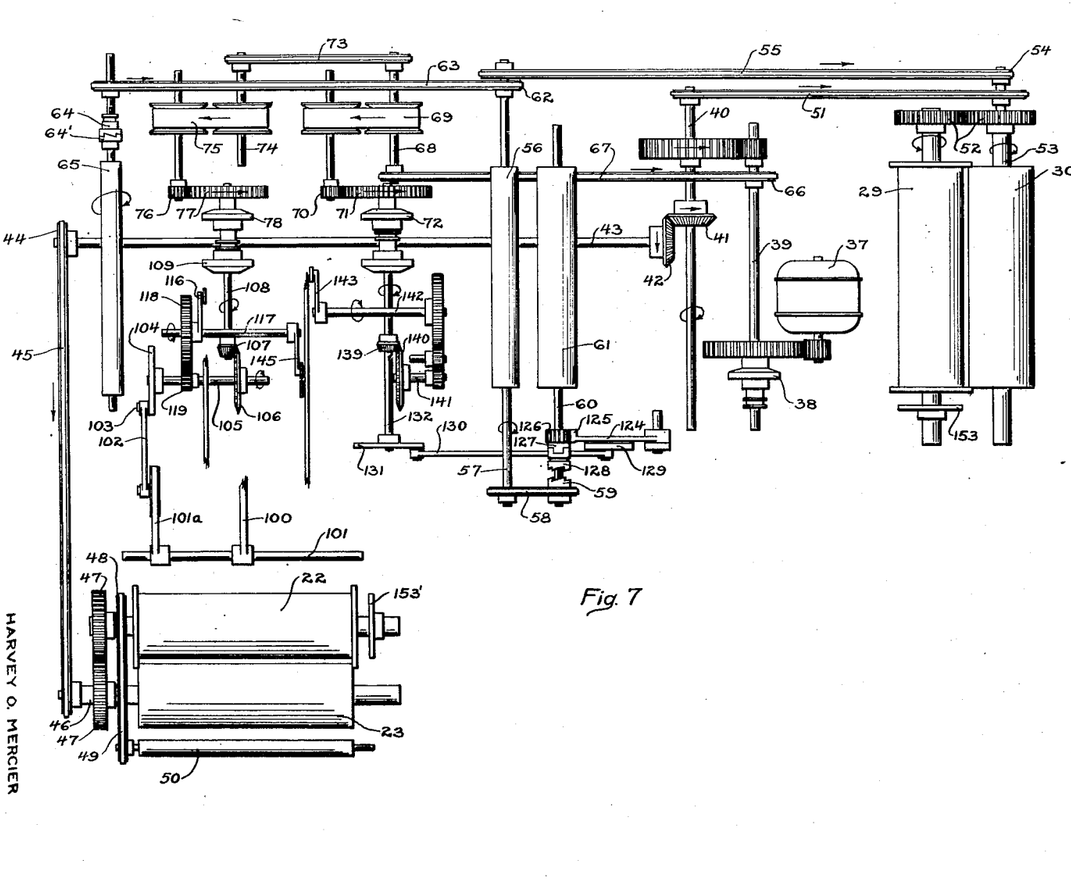
Fig. 7 is a diagrammatic view showing the control and driving mechanisms, some of the parts being slightly displaced from their actual positions in the machine.

Reference will now be had to Fig. 7, which is a diagrammatic representation of the driving connections for the several sets of rollers, aprons, and clutches. It will be understood that this figure is in part a development and does not show the parts in the actual positions or relationship that they occupy in the machine, such relationship being clearly shown in the other figures of the drawings. In this Fig. 7, 37 indicates an electric motor or other source of power, which is connected through a clutch 38 to rotate the main drive shaft 39. This shaft is geared to a second shaft 40, having a bevel gear 41 driving a bevel gear 42 fixed to the shaft 43, on the opposite end of which there is a sprocket 44 driving a chain 45, which engages a sprocket on the shaft 46 of the roller 23. The roller 23 is connected by gears 47 to drive the roller 22. The shaft of the roller 22 carries a sprocket 48, having a chain 49 for driving the roller 50 of the guide apron 25 (Fig. 11).

The shaft 40, through a chain and sprocket drive 51, drives the lower roller 30 of the second pair of sheeting rollers which is connected by gears 52 to drive the upper roller 29. The shaft 53 of the roller 30 has a sprocket 54 at one end, which through a chain 55, drives the roller 56 of the conveyor apron 28, (Fig. 11). The roller 56 is mounted on a shaft 57 which, at its opposite end, has a chain and sprocket drive 58 with one element 59 of a double clutch mounted on the shaft 60 of the roller 61, which drives the second reciprocating apron 32 (Fig. 11). On the shaft 57 there is a second sprocket 62, which, through a chain 63, drives one element 64 of a clutch, which periodically rotates the driving roller 65 of the first reciprocating apron 26.

The main drive shaft 39 also carries a sprocket 66 which, through a chain 67, drives the shaft 68 in one side of an adjustable Reeves drive 69, which, through suitable gears 70, 71, drives one side 72 of a combination clutch and brake mechanism for controlling the operation of the second reciprocating apron 32.

The opposite end of the shaft 68 is connected by a chain 73 with the shaft 74 on one side of a second adjustable Reeves drive 75, which, through gears 76, 77, drives one element 78 of a second clutch and brake mechanism controlling the operation of the first reciprocating apron 26.

From the above description it will be apparent that when the motor 37 is running and the main clutch 38 is in engagement, the sheeting rollers 22, 23, the guide apron 25 (Fig. 11), the intermediate conveyor apron 28 (Fig. 11), the rollers 29, 30, and the clutch elements 59, 64, 72, and 78 will be rotated continuously; and that the rotation of the apron drive rollers 61, 65 will be dependent upon the position of the clutch members 128 and 64. The operation of the two reciprocating aprons and their driving rollers 61, 65 are controlled through the combination clutch and brake members, indicated at 72 and 78, together with their associated control mechanisms, as is more fully shown in Figs. 8, 9, and 10.

Figure 1:
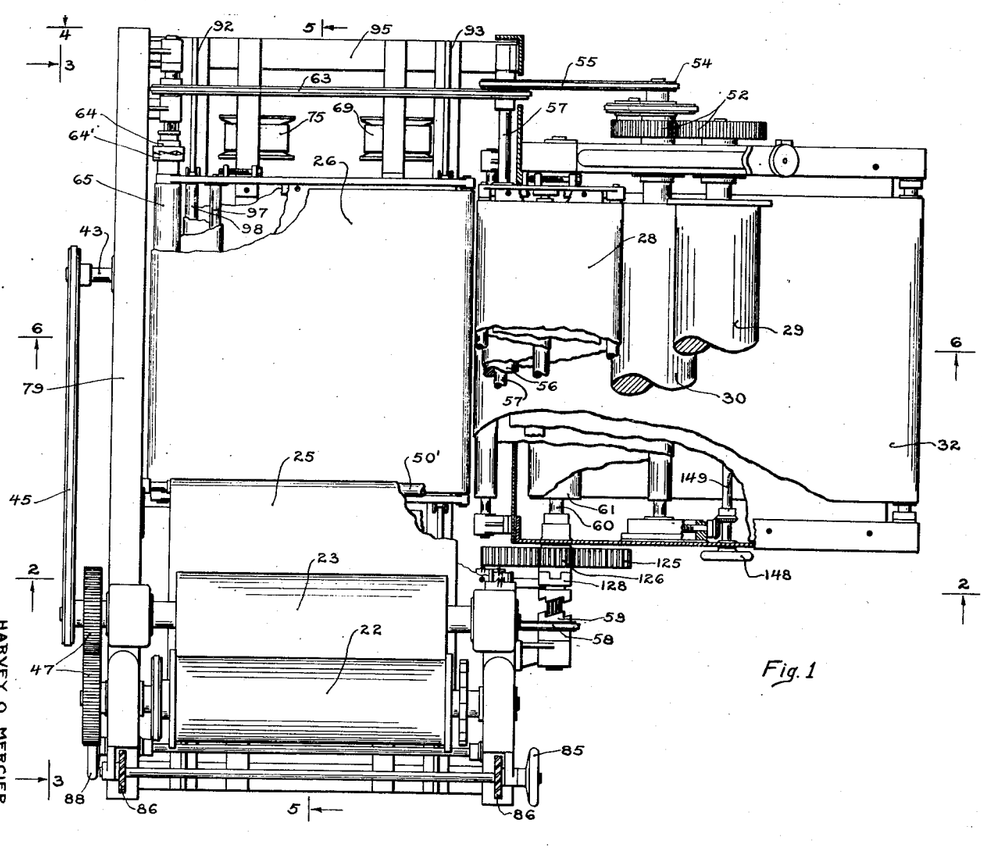
Fig. 1 is a plan view of a machine embodying my invention, parts being omitted and others being broken away to show the arrangement of the aprons.
Figure 3:
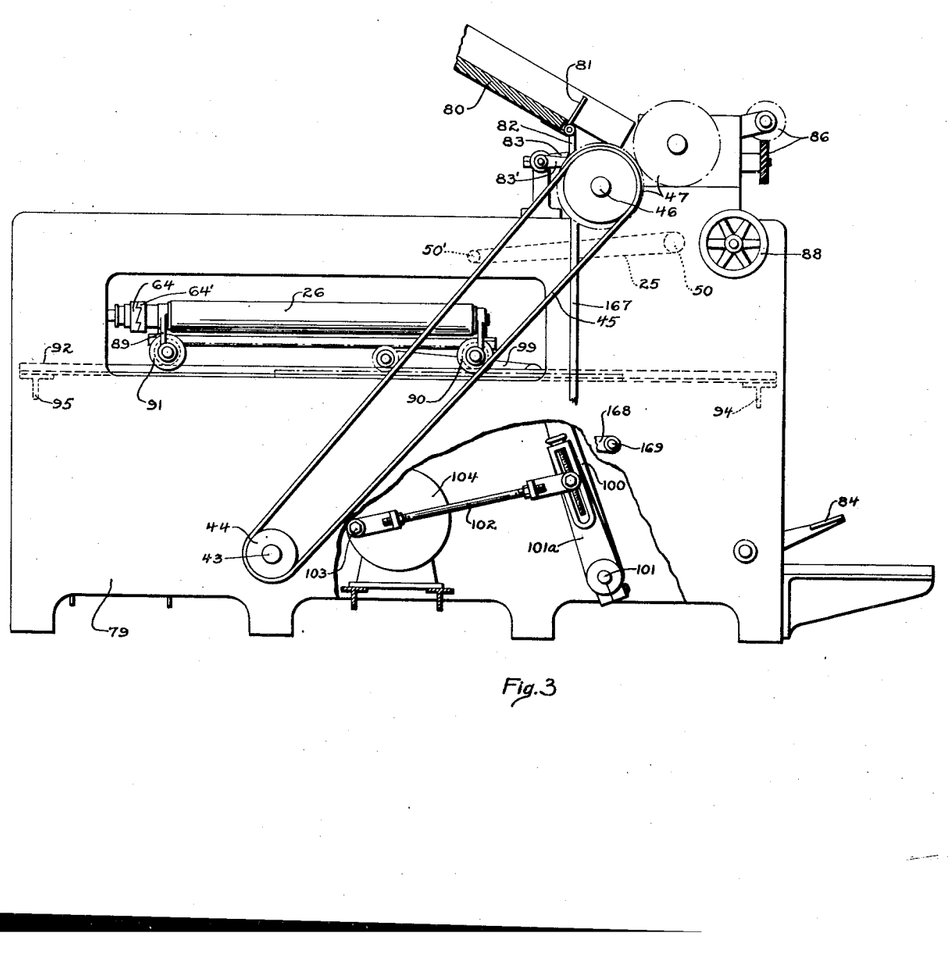
Fig. 3 is an end elevation, looking in the direction of the arrows 3—3 of Fig. 1, part of the frame being broken away to show the mechanism for oscillating the apron carriage.
Figure 5:
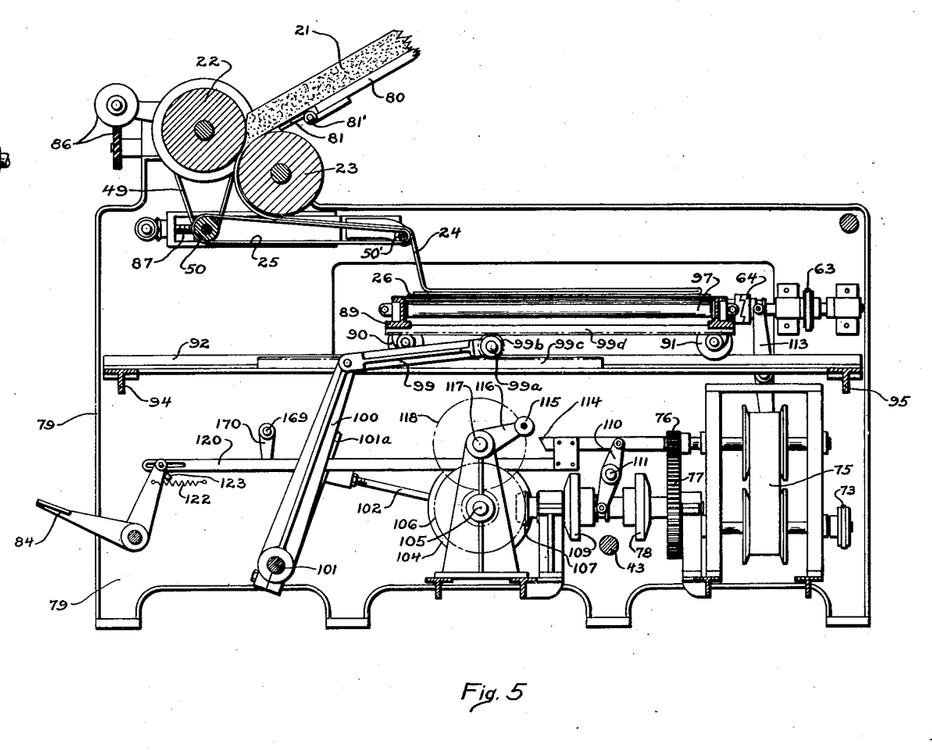
Fig. 5 is a section on the line 5—5 of Fig. 1.
Figures 13, 14:
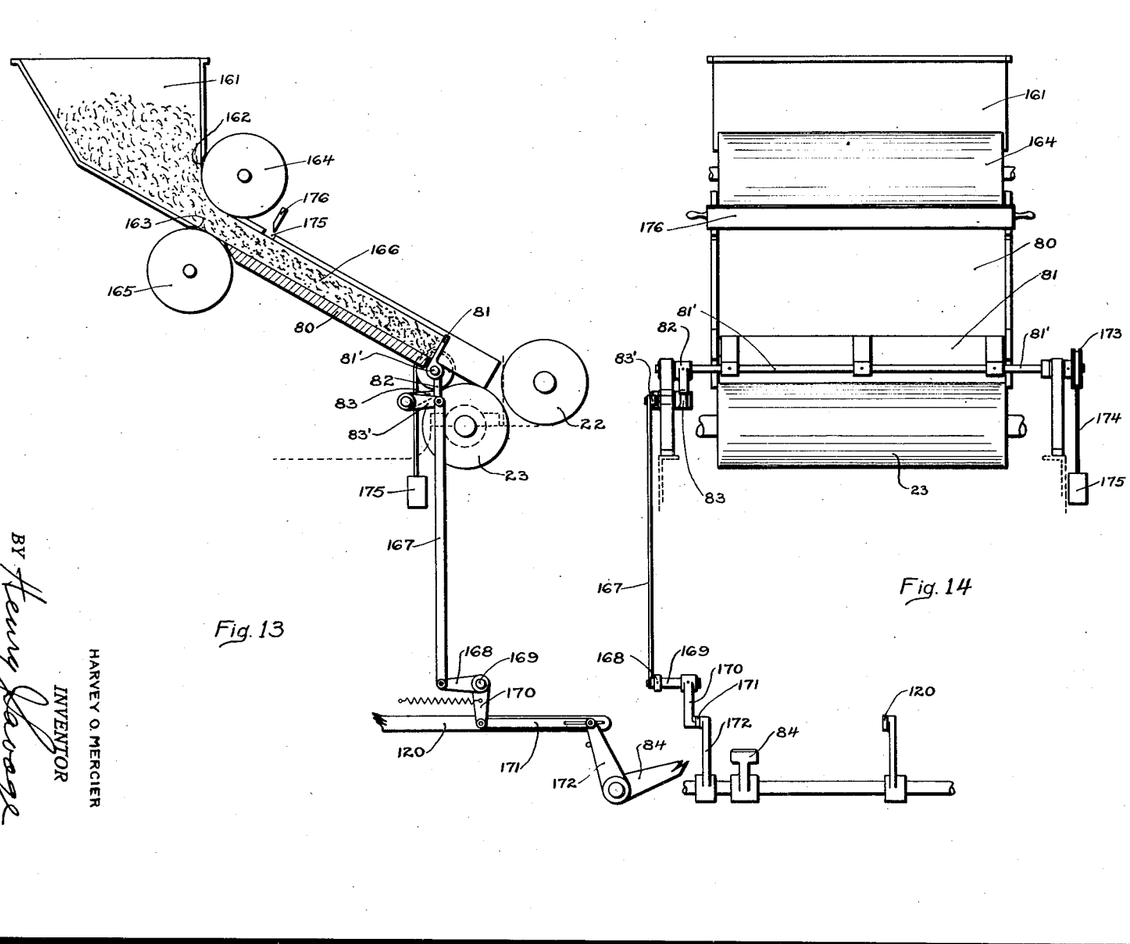
Fig. 13 is a section through a modified form of dough feeding means.
Fig. 14 is a front elevation, looking from the right toward Fig. 13.

Referring to Figs. 1, 3, and 5, the machine has a main frame which is indicated generally by the number 79 in the several views and supports an inclined feed board 80, adapted to receive the batches of dough 21, and at its lower end, adjacent the rollers, has a hinged gate 81 for controlling or timing the delivery of the dough to the first set of feed rollers. The gate 81 is secured to a shaft 81' on one end of which there is a finger 82 engaging a trigger 83 secured to one end of a short shaft to which the lever 83' is rigidly connected, the lever 83' being connected by a lost-motion connection to the pedal 84, which controls the operation of the machine, as best shown in Figs. 13 and 14. The rollers 22, 23 are mounted on the frame of the machine and are provided with a hand wheel 85, which, through gearing 86, is provided for adjusting the roller 22 toward or away from the roller 23 to vary the thickness of the sheet being rolled. The rollers 50 and 50' for driving the guide apron 25 are mounted in an adjustable frame (Fig. 5) provided with an adjusting screw 87, connected to a hand wheel 88 (Fig. 3) for shifting the apron and frame to adjust the delivery point of the apron 25 with respect to the apron 26.

Figure 2:
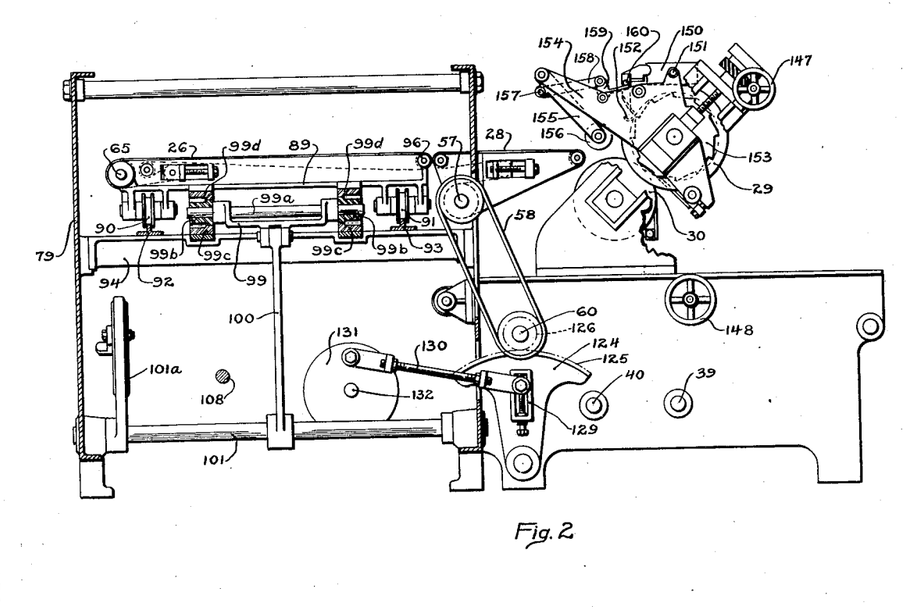
Fig. 2 is a part side elevation and part section taken on the line 2—2 of Fig. 1, but showing the flour dusting box on the second set of rollers.
Figure 4:
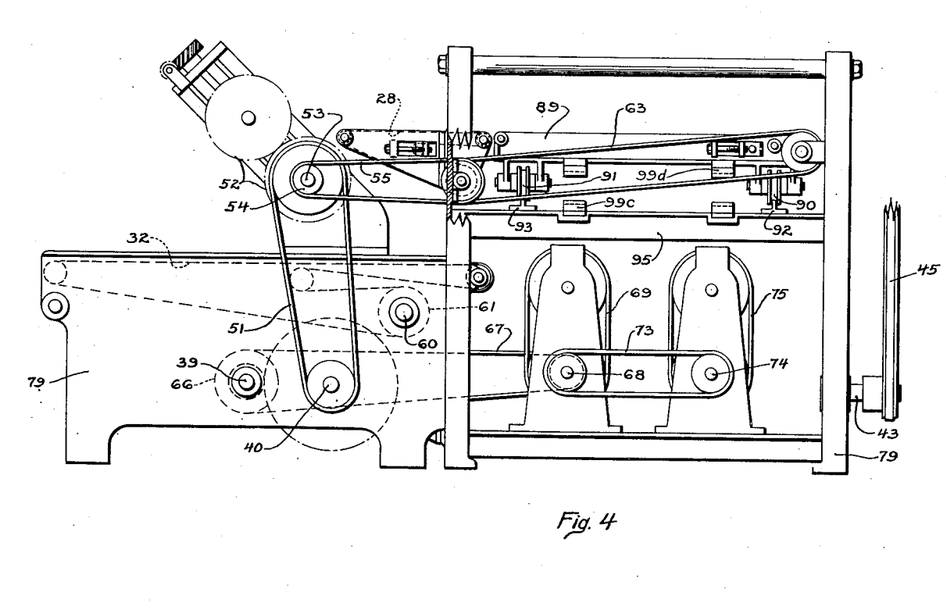
Fig. 4 is a side elevation, looking in the direction of the arrows 4—4 of Fig. 1, the first set of rollers and feed board being omitted, and the flour duster being omitted from the second set of rollers.
Figure 6:
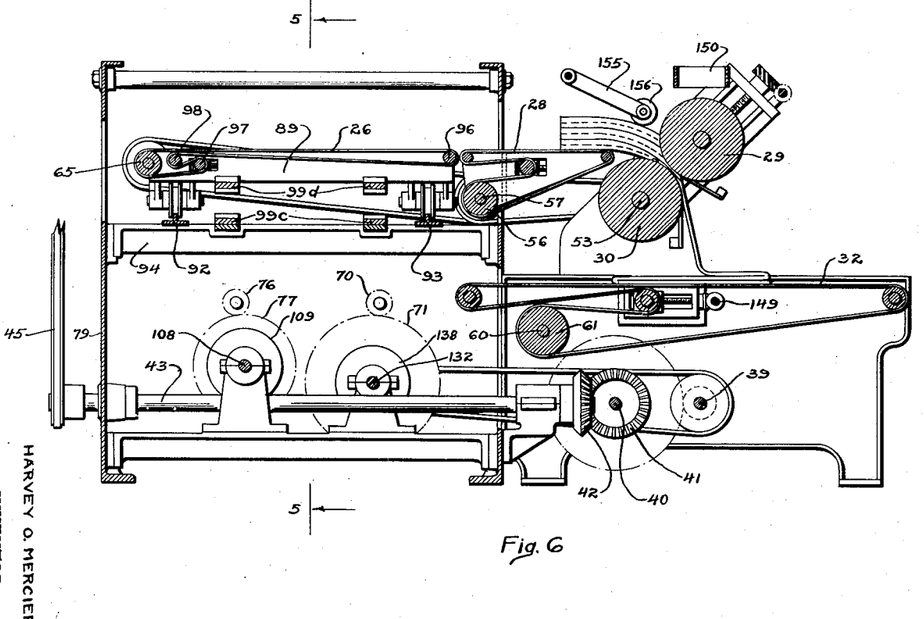
Fig. 6 is a section on the line 6—6 of Fig. 1.

The first reciprocating apron 26 is mounted on a travelling carriage 89, having rollers 90, 91 running on a pair of short tracks 92, 93, (Fig. 4), carried by cross-bars 94, 95 secured to the main frame 79 of the machine. The reciprocating apron 26 has two distinct movements, it being reciprocated bodily laterally while dough is being sheeted by the rollers 22, 23, and when the batch of dough has been deposited in folds on it, is driven continuously from the roller 65. This apron also passes over a guide roller 96 and intermediate its ends passes over the take-up rollers 97, 98 (Figs. 1 and 6). One element 64' of the clutch 64 is fixed to the shaft of the roller 65 and it, together with the apron and guide rollers, reciprocates with the travelling carriage 89, which is moved to and fro on the tracks 92, 93 by means of a link 99 (Fig. 5) connected at one end to a shaft 99a having pinions 99b at each end (Fig. 2). These pinions 99b mesh at the bottom and top with pairs of racks 99c and 99d, the racks 99c being fixed relative to the frame of the machine and the racks 99d being attached to the carriage 89. (Figs. 2 and 6). The link 99 is connected to the upper end of an oscillating lever 100, and by means of the racks and pinions just described, the amplitude of movement of the carriage 89 will be twice the amplitude of the link 99 and lever 100. The lower end of the lever 100 is secured to an oscillating shaft 101 mounted in bearings in the lower part of the main frame. The shaft is oscillated by a lever 101a mounted thereon and having an adjustable connection with a pitman 102 (Figs. 3 and 5) to vary the throw of the lever 100 and travel of the carriage 89. The opposite end of the pitman is connected to a pin 103 on a crank disc 104, fixed on a shaft 105, having a bevel gear 106 meshing with a gear 107 on the shaft 108, which is controlled by the clutch and brake mechanism 78 and driven from the Reeves drive 75 (Figs. 5 and 7).

When a batch of dough is being rolled by the first set of rollers 22, 23, the sheet is carried away from the rollers by the apron 25 and delivered to the apron 26, which during that interval is being reciprocated with the carriage 89, and the clutch elements 64, 64' are out of engagement so that there is no cross travel of the apron 26. When the batch of dough has been completely rolled by the rollers 22, 23 and is deposited in folds on the apron 26, the reciprocations of the carriage are stopped with the carriage 89 always at its extreme right hand position as shown in Fig. 5 so that the clutch element 64 can be thrown into engagement with the clutch element 64', which rotates the roller 65 and causes the upper run of the apron 26 to travel to the right in Fig. 6 or toward the observer in Fig. 5 and deliver the batch of rolled and folded dough to the apron 28. This apron runs continuously and feeds the batch of folded dough between the second set of rollers 29, 30.

Figures 8, 9:
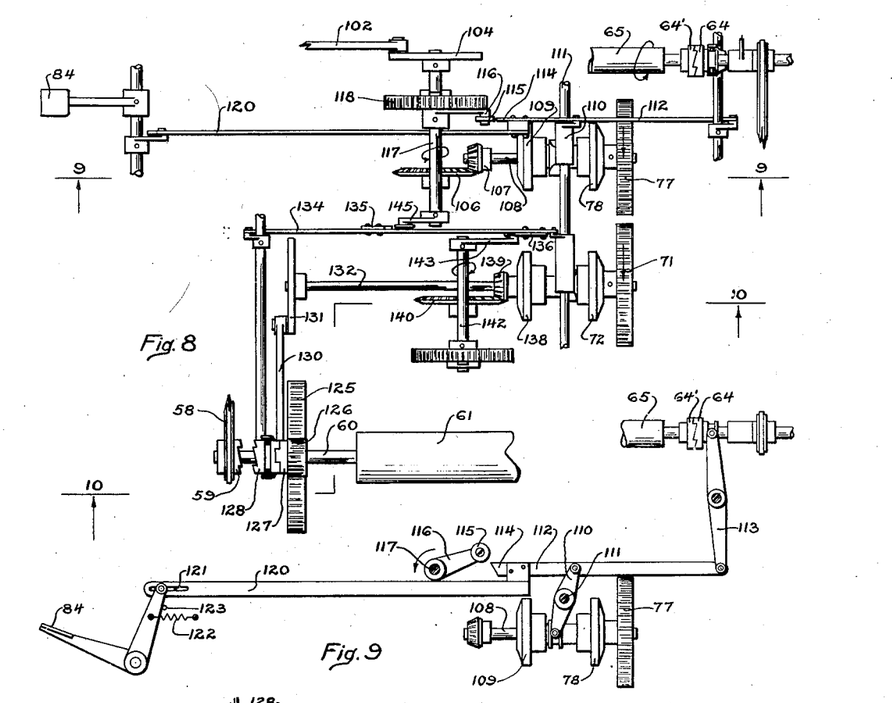
Fig. 8 is a plan view, partly diagrammatic, of the clutch control mechanism.
Fig. 9 is a section on the line 9—9 of Fig. 8.

The operations of the dough folding and delivery apron 26 are controlled through the combination clutch and brake 78, and its associated mechanism, as best shown in Figs. 7, 8, and 9. The clutch and brake mechanism 78 is not shown in detail, but it is a commercial unit, the number 78 being applied to the clutch end of the unit while the brake unit is indicated by the number 109. The operation of this unit is controlled by a lever 110, (Fig. 9), which is mounted to oscillate on the fixed shaft 111. When the lower end of this lever is thrown to the left, as shown in Fig. 9, the brake element 109 comes into operation to stop rotation of the shaft 108, and when it is thrown to the right, it engages with the clutch member 78 to drive the shaft 108 and reciprocate the carriage 89 and apron 26. The upper end of the clutch control lever 110 is pivotally connected to the clutch control slide 112, the right hand end of which is pivotally connected to a second lever 113 for shifting the clutch element 64. The slide 112 is actuated in one direction to throw the clutch 78 into engagement by means of the pedal 84, and the slide carries a cam 114, which is engaged by a roller 115 to throw the clutch out of engagement. The roller 115 is carried by the clutch control arm 116, secured to a shaft 117 which is driven by gears 118, 119 from the shaft 105 (Fig. 7), the ratio of the gears 118, 119 being such that the gear 118 and arm 116 will make one revolution while the apron 26 is reciprocating a predetermined number of times and a batch of dough is being rolled by the rollers 22, 23.

In the present machine the ratio of the gear 119 to the gear 118 is one to four, so that the table 89 and apron 26 will make four complete oscillations while the dough is being rolled, which will result in the batch of dough being deposited on the apron in a maximum number of eight folds. The batch of dough will usually be large enough to make about six complete folds so that the table will begin its reciprocation just before the sheet of dough reaches it and will continue for one or two strokes after the sheet of dough has been completed. This overrun at each end of the cycle is necessary to insure complete delivery and folding of the dough sheet. If this overrun of the cycle were not provided, there might be occasions when a part of the dough sheet would still be on the apron 25 when the carriage 89 had completed its reciprocations. The gear ratio of one to four, as shown in the drawings, is not essential but will be varied to suit different kinds of dough and different sized batches, as occasion may require. The clutch control slide 112 is connected to a bar 120 which in turn is connected by a slotted connection 112 with the pedal 84. The spring 122 is adapted to return the pedal against the stop 123 after it has been actuated by the operator to set the machine in motion. The slide 112 is moved in one direction (to the left in Figs. 8 and 9) to disengage the clutch 64 and to engage the clutch 78, and after the machine has completed one operation; that is, after one batch of dough has been deposited in folds or layers on the apron 26, the arm 116 will have made one revolution which brings the roller 115 into contact with the cam 114 to shift the slide 112 to the right, (Figs. 8 and 9), which throws the clutch 64 into engagement and rotates the roller 65 and applies the brake 109 to stop rotation of the mechanism for oscillating the carriage. Rotation of the roller 65 drives the apron 26 at right angles to its previous reciprocations so that it delivers the folded batch of dough to the transfer apron 28 which feeds it to the second set of rollers 29, 30.

Figure 10:
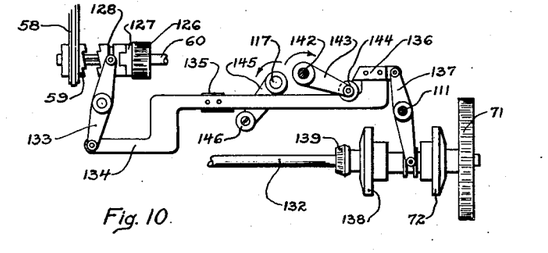
Fig. 10 is a section on the line 10—10 of Fig. 8, showing the clutch and driving control mechanism for the cross-roll dough apron.

The apron 32, which receives the sheet of dough after it has been cross-rolled by the rollers 29, 30, has two movements. When the dough is being rolled, the upper run of the apron is oscillated so that the dough will be folded as it is received by the apron, this oscillatory movement being imparted to the apron by a corresponding rotation of the driving roller 61, which is alternately driven in opposite directions by an oscillating segment 124, (Fig. 2) which at its upper end is provided with gear teeth 125, meshing with a pinion 126 mounted for rotation on the shaft 60 of the roller 61. This gear 126 is secured to or formed integral with one side of a clutch member 127 (Figs. 7, 8, 10). The clutch member 59, previously referred to, is also rotatably mounted on the shaft 60 and a double faced clutch member 128 is splined to the shaft 60 and is adapted to be shifted into engagement with either the clutch member 59 or the clutch member 127. When the clutch 128 is in engagement with the clutch 59, the shaft 60 drives roller 61 and apron 32 will be driven continuously, and this operation takes place after the dough has been rolled the second time and deposited in folds on the apron 32 and is ready for delivery to the delivery platform 36. When the clutch 128 is in engagement with the clutch 127, the drive roller 61 will rotate first in one direction and then in the other so as to reciprocate the upper run of the apron 32, the extent of this oscillatory movement being controlled by the amplitude of the oscillation of the segment 124, which has an adjustable connection 129 (Fig. 2) with a pitman 130, which is connected to a crank disc 131, mounted on the shaft 132, driven in timed relation through the combination clutch and brake member 72 (Fig. 7). Referring to Figs. 7, 8 and 10, the clutch member 128 is controlled by a lever 133, connected to a clutch operating slide 134, carrying cams 135, 136, and at its opposite end being connected to one end of a lever 137 for operating the combined clutch and brake member 72, the brake element being indicated by the number 138. In practice this brake element 138 may be omitted because it is not essential that the segment 125 be brought to rest at any definite point in its travel. The clutch 72 is mounted on the shaft 132, which has a bevel gear 139 meshing with a gear 140 on a shaft 141, which through a train of gears, drives the shaft 142, on one end of which the clutch operating arm 143 is mounted. This arm carries a roller 144 for actuating the cam 136 in one direction, and the shaft 117 carries an arm 145 having a roller 146 for operating the cam 135 and slide 134 in the opposite direction. It will be noted that the arm 145 is fixed on the shaft 117, which also carries the arm 116 that cooperates with the cam 114 to disengage the clutch 78.

The ratio of the shaft 141 to shaft 142 will be determined by the thickness of the sheet of dough rolled by the rollers 29, 30, and the number of laps to be made in the dough on the apron 32, but usually it will be greater than the ratio between the gears 119 and 118, because the rollers 29, 30 will deliver a thinner sheet than the rollers 22, 23. But whatever the ratio may be, the Reeves drive 69 will be coordinated with the Reeves drive 75 so that the shaft 142 and its associated clutch operating arm 143 make one revolution per cycle of the machine. By adjusting the rollers 29, 30 and the thickness of the sheet of dough delivered to the apron 32, the pressure exerted on the dough in rolling can be equalized between the rollers 29, 30, and the rollers on the cutting machine to which the stack 35 (Fig. 11) is delivered, so that the pressure is not too great at either point, but will be graduated to suit the character of the dough, its final thickness, and other characteristics.

It will be noted that the angular positions of the clutch operating arms 116, 145, and 143 are such that when the clutch 78 is disengaged, the clutch 64, 64' will be engaged so that the apron 26 will be driven continuously to deliver the batch of dough to the intermediate apron 28. At this time the clutch 72 is also engaged, which will oscillate the segment 124 and also the clutch member 128 will be in engagement with the clutch member 127 so that the upper run of the apron 32 will be reciprocated. When this part of the cycle has been completed, the clutch operating arm 143 will have made nearly a complete revolution, clockwise, from the position which it occupies in Fig. 10, and will have forced the cam 136 to the right, which disengages the clutch 72 and applies the brake 138 and during this interval the arm 145 remains stationary in the position shown in Fig. 10. This same movement causes the clutch member 128 to be shifted into engagement with the clutch member 59 so that the roller 61 will be driven continuously to deliver the batch of dough from the apron 32 to the delivery platform 36 (Fig. 11). The clutch 128, 59 remains in engagement and the roller 60 and apron 32 are driven continuously until the roller 146 has progressed far enough in the next cycle to engage cam 135 and force the slide 134 to the left (Fig. 10), which is done when the next batch of dough has been delivered to the apron 26 ready for transfer to the intermediate transfer apron 28.

The distance between the rollers 29, 30, is adjusted by mechanism of conventional form actuated by the hand wheel 147. Also there is a take-up roller provided for the apron 32 to vary its tension, which is controlled by a hand wheel 148 mounted on a shaft 149, as best shown in Figs. 1 and 6.

As shown in Fig. 2, I have provided a means for dusting flour on the dough as it is sheeted by the rollers 29, 30. This dusting means comprises a box 150 which is pivotally mounted at 151 on the frame supporting the rollers, and has a perforated bottom, preferably formed from a fine meshed screen. This box has a depending finger 152, which is lowered while dough is passing between the rollers so as to be engaged by the teeth of a ratchet wheel 153, mounted on the shaft carrying the roller 29. As this ratchet wheel rotates, the teeth engage the finger 152 and shake the box, causing the flour to sift through the screen and be distributed evenly over the roller 29 and the sheet of dough being formed.

The frame supporting the roller has a rearwardly extending arm 154, at the end of which a bell crank lever 155 is pivoted, the lower end of the long arm of the lever having a roller 156 which is engaged by the dough that is being fed to the rollers from the apron 28. The short arm of this lever is connected at 157 to one end of a link 158, the opposite end of which is connected to a trigger 159, engaging a pin 160 on the finger 152 to lift it out of engagement with the ratchet 153 or permit it to lower sufficiently to engage the ratchet teeth. The operation of this flour duster is automatic and is controlled by the dough which is being rolled by the rollers 29, 30. When the parts occupy the positions shown in Fig. 2, the finger 152 is lifted out of engagement with the ratchet and the box 150 will not be shaken to sift flour on to the roller, but when a batch of dough approaches the rollers from the apron 28, it will engage the roller 156 and raise it, which, through the link 158, depresses the inner end of the trigger 159 which allows the flour box to tilt about its trunnions 151, and lowers the finger 152 into engagement with the ratchet 153. When the batch of dough has passed from between the sheeting rollers, the roller 156 which is quite heavy drops down, causing the trigger 159 to engage the lug 160 on the finger 152 and raise it out of engagement with the ratchet, and stop the sifting of the flour.

When the feed board 80, Figs. 5 and 11, is used, the batch of dough must be weighed, or its mass accurately determined by some suitable means, before it is placed on the board. In the modified feeding device shown in Figs. 13 and 14, I have shown a feeding device which automatically measures the batches of dough.

The dough board 80 (Figs. 13 and 14) at its upper end is provided with a hopper 161, which is contracted at its lower end and has top and bottom openings 162 and 163 adapted to receive a pair of rollers 164, 165, which roll the dough into a thick slab or block 166 that is delivered to the feed board 80. The lower end of the feed board 80 is stopped by the hinged gate 81, which is fixed to a shaft 81' mounted to oscillate on the feed board and at one end has a finger 82 engaging the trigger 83 fixed to one end of a short shaft to which the arm 83' is attached. The arm 83' is pivotally connected by a link 167 to the arm 168 which is fixed to the shaft 169 carrying the arm 170. One end of a link 171 is pivotally connected to the arm 170 and its opposite end has a lost motion connection with an arm 172 fixed on the shaft carrying the pedal 84. At its opposite end the shaft 81' has a pulley 173 over which a cord or belt 174 runs, one end being attached to the pulley and the lower end supporting a weight 175, which is just sufficient to return the gate 81 to close position when released from the weight of the batch of dough, the lost motion connection of the link 171 permitting this return movement. The sides of the feed board have transverse slots 175 located at such distance from the gate 81 that when the front end of the slab of dough reaches the gate 81, there will be one batch of dough contained on the feed board 80 between the gate and slot.

A knife 176 is provided so that when the said edge of the dough reaches the gate 81, it can be cut off by pressing this knife down through the slot 175 to separate the batch of dough from the mass above it. When the dough reaches the gate 81, the operator stops the rollers 164, 165, and with the knife 176 cuts off a batch of dough. The pedal 84 is then actuated to lower the gate 81 and start the machine in operation. When the batch of dough has passed over the gate 81, it will be returned to its initial position by the weight 175, which operates to turn the pulley 173 backward, this motion being permitted by reason of a lost motion connection between the link 171 and the arm 172.

I have not shown the driving means for the rollers 164 and 165 but they can be driven of course from the main drive, or in any suitable manner, and the precise means used for driving them is not a part of the present invention, the only essential part of the drive being that the control of the rollers 164, 165 must be independent, or preferably is independent, of the cycle of the machine.

In the operation of the machine, the operator first starts the motor 37 (Fig. 7) and throws in the clutch 38, which starts the two sets of rollers 22, 23 and 29, 30 and also starts the two Reeves drives 69, 75, the guide apron 25, (Fig. 3), intermediate apron 28 (Fig. 2) and the clutch elements 72, 78, 64, all of which parts rotate continuously during the operating of the machine and are not effected during the cycle. With these parts in operation the operator feeds a batch of dough to the feed board 80 where it rests against the gate 81, in each batch of dough, the scrap formed when a previous batch passed through the cutting machine is usually incorporated. The machine is now ready to start its operation, the slide 112 occupies its right hand position, as shown in Fig. 9, the brake 109 is effective to prevent rotation of the shaft 108, and the shaft 117 is stationary, it having been stopped at the end of the previous cycle with the roller 115 just above the cam 114.

The shaft 142 is also stationary and the roller 144 is just below the cam 136, the slide 134 being in its extreme right position (opposite to that shown in Fig. 10) with the brake 138 effective to prevent rotation of the shaft 132 and the clutch element 128 in engagement with the clutch 59.

The operator now places a batch of dough on the feed board 80 and presses the pedal 84 down just far enough to rock the lever 172 and through its connections pull down the trigger 83 which releases the finger 82. The weight of the dough pressing on the gate 81 forces it down and the batch slides down to the rollers 22, 23, the inclination of the feed board being such that the dough will slide down it by gravity. As soon as the sheet of dough begins to come through to the apron 25, the operator presses the pedal 84 all the way down, which shifts the slide 112 to the left (Fig. 9) and causes engagement of the clutch member 78 and disengagement of the clutch members 64, 64'. The clutch 78 now drives the shafts 108 and 105, Fig. 7, and through the link and lever connections 102, 100 starts reciprocation of the table 89 and apron 26, but the clutch 64, 64' is out of engagement and roller 65 does not rotate. This also starts rotation of the shaft 117, which carries the slide operating arms 116 and 145, the rollers on these arms at the beginning of their rotation being just beyond the cams 114 and 135 which they operate respectively. The apron 26 on the carriage 89 continues to reciprocate until the shaft 117 has made a complete revolution, during which period the table 89 and apron 26 will have made four reciprocations or eight strokes, and at the end of which the roller 115 on the arm 116 will have engaged the cam 114 and forced it to the right (Figs. 8 and 9) so as to disengage the clutch 78 and engage the clutch members 64, 64'. This stops rotation of the shafts 108, and 117, and also the reciprocations of the table 89, and starts rotation of the drive roller 65, which produces continuous movement of the apron 26 to deliver the batch of sheeted and folded dough to the apron 28.

The apron 28 is driven continuously and now delivers the batch of dough to the rollers 29, 30 where it is rolled at right angles to its previous direction of rolling; or in other words, it is cross-rolled. Just before the shaft 117 completed its rotation, the roller 146 engaged the cam 135 and forced the slide 134 to the left (Fig. 10), which operation threw the clutch 72 into engagement and also shifted the clutch member 128 into engagement with the clutch 127. This operation starts the apron 32 reciprocating and also starts rotation of the shaft 142, which carries the slide operating arm 143, the roller of which, when it started its rotation, was just below the cam 136. The sheet of dough formed by these rollers 29, 30 is delivered to the apron 32, which is now reciprocating and continues to do so until the entire batch of dough has been sheeted and folded on it, as shown in Fig. 11. While the dough is being rolled by the rollers 29, 30, it is dusted with flour by the flour duster, shown in Fig. 2, so that the folds of dough will not adhere and can be readily separated when the batch is taken to the rolling and cutting machine.

When the slide 134 was shoved to the left, Fig. 10, and the clutch 72 engaged, this started rotation of the shaft 142 and the clutch operating arm 143, and their rotation is so timed that when the entire batch of dough has been delivered to the apron 32, the roller 144 will contact with the cam 136 and force the slide 134 to the right, which disengages the clutch 72 and applies the brake to stop rotation of its connected parts. This same operation throws the clutch lever 133 in the opposite direction so as to engage the clutch members 128 and 59, which starts continuous rotation of the roller 61 and causes the apron 32 to deliver the batch of dough to a platform, from which it is then carried to a cutting machine where the folds are separated and the sheet of dough is passed through the finishing rollers, which reduce it to the desired final thickness and thence to the cutters which form the dough into biscuits, ready for baking.

This completes the cycle of operations which will be repeated as frequently as the operator furnishes batches of dough to the feed board 80 and operates the pedal 84, which he does once for each batch of dough and cycle of the machine.

When the automatic feed shown in Figures 13 and 14 is employed, the operation is the same in all respects as that just described, except that the operator instead of weighing or measuring the batches of dough by hand, operates the rollers 164, 165, and knife 176 to measure the batches of dough automatically. When a batch of dough thus measured has passed over the gate 81, it will be raised to closed position by the weight 175, and the operator will then start the rollers 164, 165 which will form and start another slab of dough down the feed board 80 until it reaches the gate 81. The operator then stops the rollers 164, 165 and cuts off the batch with the knife 176 so that it is ready to be fed to the machine when the operator again actuates the pedal 84 to start a new cycle of operations. The mechanism for controlling the gate 81 is shown completely only in Figures 13 and 14, but its exact location in respect to the machine as a whole is sufficiently indicated in Figures 3 and 5.

With this machine, the rollers 22, 23 and 29, 30 are driven at very high speed so that the machine has a very large capacity sufficient to supply dough to several cutting machines and by reason of this increased speed, the dough reaches the cutting machines in very much better condition than with machines heretofore in use, where the rolling and sheeting operations were necessarily slow or limited to the capacity of a single cutting machine.

I have shown the flour sifting box 150 only in Fig. 2, it being omitted from the other figures including the first pair of feed rolls so as to avoid needless repetition and simplify the drawings, but in Fig. 7 I have indicated at 153' how a ratchet similar to ratchet 153 will be employed to shake a flour box for the first set of rollers, when it is desired to use one.

While I have shown and described one practicable machine, it is to be understood that it is illustrative only and I am not to be limited thereto, but claim as my invention all modifications and equivalents thereof that come within the scope of my claims.

Many modifications of the invention and changes in the machine illustrated will occur to those skilled in this art, thus the two sets of rollers may be arranged parallel and the batch of dough turned at right angles before its delivery to the second set. Also the two aprons 26, 32 may be of similar construction and operation.

What I claim is:

1. In a machine of the class described, the combination of means for feeding dough, means for forming the dough into a sheet, means for lapping the sheet into a plurality of superimposed layers with substantially coinciding edges, means for delivering the lapped sheet of dough edges foremost to a second sheeting means for again sheeting the dough at right angles to its first sheeting, means for lapping the sheet again into a plurality of superimposed layers, and means for delivering the lapped sheet of dough from the machine.

2. In a machine of the class described, the combination of two sets of sheeting means adapted successively to sheet the same batch of dough, means for feeding a batch of dough to said first sheeting means, means for folding the sheeted dough into a stack of superimposed layers with substantially coinciding edges, means for delivering the folded and sheeted batch of dough with its edges foremost to the second sheeting means.

3. In a machine of the class described, the combination of two sets of sheeting means adapted successively to sheet the same batch of dough, means for feeding a batch of dough to said first sheeting means, means for folding the sheeted dough into a stack of superimposed layers with substantially coinciding edges, means for delivering the folded and sheeted batch of dough with its edges foremost to the second sheeting means, and means for again folding the sheeted batch of dough into a plurality of superimposed folds.

4. In a machine of the class described, the combination of two sets of sheeting means operating at right angles to each other, means for supplying successive batches of dough to said first means, means for folding each batch of dough in stacked folds as it is sheeted, means operable when each batch is folded to deliver it bodily at right angles and feed it edge foremost to the second sheeting means, said second sheeting means sheeting said stacked sheets at right angles to the direction of their first sheeting.

5. In a machine of the class described, the combination of two sets of sheeting means operating at right angles to each other, means for supplying successive batches of dough to said first means, means for folding each batch of dough in stacked folds with substantially coinciding edges as it is sheeted, means operable when each batch is folded to deliver it at right angles to the second sheeting means, and means for receiving and again folding each batch as it leaves the second sheeting means, and means for delivering the batches successively from the machine.

6. In a machine of the class described, the combination of a pair of dough sheeting rollers, a carriage for receiving a batch of sheeted dough from the rollers, means for moving the carriage only in the line that the dough is being sheeted while receiving the batch of dough, said movement being a reciprocating movement whereby the batch of dough will be received in superimposed layers, and means controlled in timed relation to said reciprocating movement for moving the batch of sheeted dough bodily from the carriage transversely to its line of reciprocation.

7. In a machine of the class described, the combination of dough sheeting rollers and means for driving the same, means for receiving a batch of sheeted dough from the rollers, means for reciprocating said receiving means while receiving the sheeted dough, and means controlled in timed relation to said reciprocations for moving said receiving means transversely to its reciprocations after it has received a batch of sheeted dough.

8. In a machine of the class described, the combination of a dough sheeting means, a second dough sheeting means, means for receiving a batch of sheeted dough from the first sheeting means, means for stacking said batch of sheeted dough in superimposed layers on said receiving means, means for delivering the stack of sheeted dough from the receiving means to the second sheeting means at right angles to the direction of its first sheeting, and means for driving and coordinating the operation thereof.

9. In a machine of the class described, the combination of means for sheeting a batch of dough, means for delivering a sheeted batch of dough in superimposed folds to a receiving means a second sheeting means, means for delivering the folded batch of dough from said receiving means to the second sheeting means at right angles to the direction in which it was first sheeted, a second receiving means adapted to receive the dough in folds from the second sheeting means, means for delivering the folded batch of dough from the machine, and means for driving and coordinating the operation thereof.

10. In a machine of the class described, the combination of sheeting rollers, means for periodically feeding batches of dough thereto, an endless conveyor for receiving the sheeted dough, means for reciprocating the conveyor transversely of its length while receiving the sheeted dough, a driving roller for driving the conveyor longitudinally, means for driving the roller periodically, and means coordinating and controlling the operation of said reciprocating and driving means in timed relation to the sheeting of each batch of dough.

11. In a machine of the class described, the combination of sheeting rollers, means for feeding batches of dough thereto, an endless conveyor for receiving the sheeted dough, means for reciprocating the conveyor parallel to the direction of sheeting of the dough, a driving roller for driving the conveyor transversely to the direction of sheeting of the dough, and control means for the reciprocating means and driving means coordinated to cause reciprocations while a batch is being sheeted and to drive the driving roller after the batch has been sheeted and received on the conveyor.

12. In a machine of the class described, the combination of sheeting rollers, means for feeding batches of dough thereto, a conveyor for receiving the sheeted dough, a guide apron for the sheeted dough between the rollers and conveyor, means for adjusting the delivery end of the guide apron with respect to the conveyor, means for periodically reciprocating the conveyor while receiving the batch of dough, and means for periodically driving the conveyor transversely of its reciprocations after the batch of dough has been deposited thereon.

13. In a machine of the class described, the combination of a pair of sheeting rollers, means for supplying batches of dough thereto, a conveyor for receiving the sheeted dough, means for causing relative reciprocations between the rollers and conveyor while the dough is being sheeted, means for driving the conveyor continuously to deliver the batch of sheeted dough therefrom, and actuating means for said driving means controlled by said reciprocating means.

14. In a machine of the class described, the combination of dough sheeting rollers, means for supplying batches of dough thereto to be sheeted, a reciprocating conveyor, means for delivering the sheeted batches of dough in superimposed folds to said conveyor, and means controlled in timed relation to the number of reciprocations for delivering the folded batch from the conveyor.

15. In a machine of the class described, the combination of sheeting rollers, means for periodically supplying batches of dough thereto, an endless conveyor for receiving the batches of sheeted dough, means for reciprocating the conveyor laterally while receiving a batch of dough, means for driving the conveyor longitudinally after the batch has been received thereon, means actuated with the operation of the dough supplying means for setting said reciprocating means in operation, and means operable at the termination of the cycle of said reciprocating means for setting said driving means in operation.

16. In a machine of the class described, the combination of sheeting rollers, means for feeding batches of dough thereto, a reciprocating carriage for receiving the sheeted dough, means for driving the reciprocating carriage, means connecting the feeding means and carriage driving means whereby the latter is set in operation after the feeding means, a conveyor on the reciprocating carriage, means for driving the conveyor, and actuating means for said conveyor driving means controlled by the operation of said carriage driving means.

17. In a machine of the class described, the combination of a carriage, an endless conveyor on said carriage, a drive roller for said conveyor, means for reciprocating said carriage and conveyor, clutch mechanism for driving said roller, clutch mechanism for driving said reciprocating means, control mechanism for simultaneously disengaging said roller driving clutch and engaging said carriage driving clutch, and means operable upon completion of the cycle of said reciprocating carriage to disengage said carriage driving clutch and engage said roller driving clutch.

18. In a machine of the class described, the combination of a carriage, means for reciprocating said carriage a predetermined number of times comprising clutch controlled mechanism, a conveyor carried by said carriage and reciprocatable therewith, means for driving said conveyor independently of the carriage, clutch mechanism for controlling said carriage reciprocating means, clutch mechanism for controlling said conveyor driving means, means operable when said carriage driving clutch is engaged to disengage said conveyor driving clutch, and means operable when said carriage has reciprocated a predetermined number of times to disengage its driving clutch and engage said conveyor driving clutch.

19. In a machine of the class described, a pair of dough sheeting rollers, and driving means therefor; means for receiving the sheeted dough from the rollers; and means for periodically feeding measured batches of dough to said sheeting rollers, said feeding means comprising a feed board having one end adjacent said sheeting rollers, a second pair of driven rollers at the other end of said feed board, a feed gate controlling the one end of said feed board, means for supplying dough to said second pair of rollers, and means for measuring a batch of dough on said feed board when one end thereof reaches said feed gate.

20. In a machine of the class described, a pair of dough sheeting rollers, and driving means therefor; means for receiving the sheeted dough from the rollers; and means for periodically feeding measured batches of dough to said sheeting rollers, said feeding means comprising a feed board having one end adjacent said sheeting rollers, a second pair of driven rollers at the other end of said feed board, a feed gate controlling the one end of said feed board, means for supplying dough to said second pair of rollers, and means for measuring a batch of dough on said feed board when one end thereof reaches said feed gate; means for driving said receiving means; actuating means for said feed gate operable to release a batch of dough to said sheeting rollers; control means for said last mentioned driving means; and means connecting said actuating means and said control means for setting the latter in operation after said feed gate has been actuated.

21. Dough feeding means, comprising an inclined feed board, a gate controlling the lower end thereof, driven spaced rollers for forming a thick slab of dough at the upper end thereof, means for supplying dough to said rollers, means for measuring a batch of dough on said board when the lower end thereof reaches said gate, means for releasing said gate, and means for returning said gate when the batch of dough has been fed from said feed board.

22. In a machine of the class described, the combination of dough sheeting rollers, means for supplying successive batches of dough thereto, a conveyor having an upper run for receiving the sheeted batches of dough, means for reciprocating said conveyor while each batch of the dough is being sheeted by said rollers, and means for stopping said reciprocating movement and driving said conveyor continuously in the same direction as said reciprocating movement only after each batch of dough has been received thereon.

23. In a machine of the class described, the combination of dough sheeting rollers, means for supplying batches of dough thereto, a conveyor having an upper run for receiving the sheeted dough, a roller for driving said conveyor, means for oscillating said roller and the conveyor while the dough is being sheeted, and means for driving said roller and conveyor continuously after the sheeted dough has been received thereon.

24. In a machine of the class described, the combination of dough sheeting rollers, means for supplying batches of dough thereto, an endless conveyor for receiving the sheeted dough on its upper run, a roller for driving said conveyor, a clutch member fixed in respect to rotation with said roller, an oscillatable clutch element, a rotatable clutch element, means for causing engagement of said fixed member and oscillatable element while the dough is being sheeted, and means for causing engagement of said fixed member and rotatable element when the batch of sheeted dough has been received on said conveyor.

25. In a machine of the class described, the combination of dough sheeting rollers, means for periodically supplying batches of dough thereto, an endless conveyor for receiving the sheeted dough on its upper run, a roller for driving said conveyor, oscillating mechanism for oscillating said driving roller to reciprocate said conveyor while a batch of dough is being sheeted, means setting said oscillating mechanism in operation upon delivery of a batch of dough to said sheeting rollers, means for continuously rotating said driving roller, and means operable after a fixed number of oscillations of said driving roller to disengage said oscillating mechanism and engage said continuously rotating means.

26. In a machine of the class described, the combination of dough sheeting rollers, means for periodically delivering batches of dough thereto, means for receiving each batch of sheeted dough from the rollers in superimposed folds, a second set of sheeting rollers, means for feeding each sheeted batch edge foremost to said second set of rollers, a conveyor having an upper run for receiving the sheeted dough from said second rollers, means for reciprocating said conveyor while a batch of dough is being sheeted by said second rollers, and means for driving said conveyor continuously when said batch of dough has been received thereon.

27. In a machine of the class described, the combination of dough sheeting rollers, means for periodically delivering batches of dough thereto, means for receiving each batch of sheeted dough from the rollers in superimposed folds, a second set of sheeting rollers, means for feeding each sheeted batch edge foremost to said second set of rollers, an endless conveyor for receiving on its upper run the sheeted batches from said second rollers, a driving roller for said conveyor, a clutch member fixed in respect to rotation with said driving roller, an oscillatable clutch element, a rotatable clutch element, means for causing engagement of said fixed member and oscillatable element when a batch of dough is fed to said second rollers, and means for causing disengagement of said fixed member from said oscillatable element and engagement with said rotatable element when the batch of sheeted dough has been received on said conveyor.

28. In a machine of the class described, the combination of dough sheeting rollers, means for periodically delivering batches of dough thereto, means for receiving each batch of sheeted dough from the rollers in superimposed folds, a second set of sheeting rollers, means for feeding each sheeted batch edge foremost to said second set of rollers, a conveyor having an upper run for receiving the sheeted dough from said second rollers, means set in operation when a folded batch of dough is fed to said second set of rollers to reciprocate said conveyor, means for rendering said reciprocating means inoperative and driving said conveyor continuously when said batch of dough has been received thereon.

29. In a machine of the class described, the combination of dough sheeting means, means for feeding dough thereto, means for dusting flour on said dough, and means controlled by the dough being fed to said sheeting means to actuate said flour dusting means.

30. In a machine of the class described, the combination of dough sheeting means, means for feeding dough thereto to be sheeted, means for dusting flour on said dough, and means controlled by the dough to operate said dusting means while the dough is being sheeted, and operable when the dough has been sheeted to render the dusting means inoperative.

31. In a machine of the class described, the combination of dough sheeting rollers, means for feeding dough thereto, a flour dusting box adjacent said rollers adapted to dust flour on the dough being sheeted, a ratchet rotatable with one of said rollers, means secured to said box and engaged by said ratchet to shake said box while dough is being sheeted by said rollers, and means located in the path of the dough being fed to said rollers and actuated by the dough to move said shaking means into or out of contact with said ratchet.

32. In a machine of the class described, the combination of dough sheeting rollers, means for feeding dough thereto, a flour dusting box mounted for vibratory movement above said rollers, a rotatable ratchet, a finger secured to said box and extending into the path of said ratchet for vibrating said box while dough is being rolled, and means for moving said finger away from said ratchet when dough is not being fed to the rollers.

33. In a machine of the class described, the combination of dough sheeting rollers, means for feeding dough thereto, a flour dusting box mounted for vibratory movement adjacent said rollers, a rotatable ratchet, a finger secured to said box and adapted to engage said ratchet to vibrate said box, and means controlled by the dough being fed to said rollers to move said finger into or out of engagement with said ratchet.

34. In a machine of the class described, the combination of sheeting rollers, means for supplying batches of dough thereto, a conveyor for receiving the batches of sheeted dough, means for reciprocating the conveyor while receiving a batch of dough, means for driving the conveyor continuously after a batch has been received thereon, means actuated in timed relation to the dough supplying means for setting said reciprocating means in operation, and means operable at the termination of the cycle of said reciprocating means for setting said driving means in operation.

35. In a machine of the class described, the combination of dough sheeting rollers, means for supplying batches of dough thereto, a conveyor having an upper run for receiving the sheeted dough, a guide for delivering the dough from the rollers to said upper run, means for adjusting the point of delivery of said guide with respect to said conveyor, means for reciprocating said upper run while receiving sheeted dough from said guide and means for stopping said reciprocating means when said batch of dough has been sheeted.

36. In a machine of the class described, the combination of dough sheeting rollers, means for supplying batches of dough thereto, a conveyor having an upper run for receiving the sheeted dough, a guide for delivering the dough from the rollers to said upper run, means for adjusting the point of delivery of said guide with respect to said conveyor, means for reciprocating said upper run while receiving sheeted dough from said guide, means for adjusting the amplitude of said reciprocations, and means for stopping said reciprocating means when said batch of dough has been sheeted.

37. In a machine of the class described, the combination of dough sheeting rollers, means for supplying dough thereto, a conveyor having an upper run for receiving the sheeted dough, a guide for delivering the dough from the rollers to said upper run, means for adjusting the point of delivery of said guide with respect to said conveyor, means for reciprocating said upper run while receiving sheeted dough from said guide, means for varying the frequency of said reciprocations, and means for stopping the reciprocations when said sheeting rollers have delivered a predetermined amount of sheeted dough to said conveyor.

38. In a machine of the class described, the combination of dough sheeting rollers, means for supplying batches of dough thereto, a conveyor having an upper run for receiving the sheeted dough, means for periodically reciprocating said conveyor while the dough is being sheeted by said rollers, means for periodically driving said conveyor continuously after said batch of dough has been received thereon, and means for adjusting the amplitude of the reciprocations of said conveyor.

39. In a machine of the class described, the combination of dough sheeting rollers, means for supplying batches of dough thereto, a conveyor having an upper run for receiving the sheeted dough, means for reciprocating said conveyor while a batch of the dough is being sheeted by said rollers, means for driving said conveyor continuously after said batch of dough has been received thereon, means for adjusting the amplitude of the reciprocations of said conveyor, and means for adjusting the speed of the reciprocations and of said driving means.

40. In a machine of the class described, the combination of dough sheeting rollers, means for supplying successive batches of dough thereto, a carriage for receiving the sheeted dough, a guide to deliver the dough from the rollers to said carriage, means for reciprocating said carriage while it is receiving dough, means for adjusting the point of delivery of said guide with respect to said carriage, and means for stopping the reciprocations of said carriage when a batch has been received thereon and for delivering said batch in a direction at right angles to its folds.

HARVEY O. MERCIER.